US006369159B1

(12) United States Patent
Barnhouse et al.

(10) Patent No.: US 6,369,159 B1
(45) Date of Patent: Apr. 9, 2002

(54) ANTISTATIC PLASTIC MATERIALS CONTAINING EPIHALOHYDRIN POLYMERS

(75) Inventors: James Patrick Barnhouse; Simon Hsiao-Pao Yu, both of North Ridgeville, OH (US)

(73) Assignee: PDM Holdings Corp., Brecksville, OH (US)

( * ) Notice: Subject to any disclaimer, the term of this patent is extended or adjusted under 35 U.S.C. 154(b) by 0 days.

(21) Appl. No.: 07/029,499

(22) Filed: May 13, 1987

(51) Int. Cl.[7] ................ C08L 55/02; C08L 71/02; C08L 71/03
(52) U.S. Cl. .................. 525/64; 525/187; 525/403; 525/404
(58) Field of Search ................ 525/187, 403, 525/404, 64

(56) References Cited

U.S. PATENT DOCUMENTS

| | | | | |
|---|---|---|---|---|
| 1,976,678 | A | 10/1934 | Wittwer | 260/54 |
| 2,353,228 | A | 7/1944 | Ducca | 260/36 |
| 2,857,360 | A | 10/1958 | Feuer | 260/45.5 |
| 2,866,761 | A | 10/1958 | Hill et al. | 260/2 |
| 2,923,690 | A | 2/1960 | Bedoit | 260/2 |
| 3,049,505 | A | 8/1962 | Grabowski | 260/45.4 |
| 3,058,923 | A | 10/1962 | Kutner | 260/2 |
| 3,135,705 | A | 6/1964 | Vandenberg | 260/2 |
| 3,135,706 | A | 6/1964 | Vandenberg | 260/2 |
| 3,156,744 | A | 11/1964 | Mullins | 260/897 |
| 3,158,581 | A | 11/1964 | Vandenberg | 260/2 |
| 3,186,958 | A | 6/1965 | Kutner et al. | 260/2 |
| 3,206,429 | A | 9/1965 | Broyles et al. | 260/45.9 |
| 3,219,591 | A | 11/1965 | Vandenberg | |
| 3,223,545 | A | 12/1965 | Gallaugher et al. | 106/287 |
| 3,230,183 | A | 1/1966 | Valko et al. | 260/2 |
| 3,231,551 | A | 1/1966 | Herold et al. | 260/88.3 |
| 3,238,275 | A | 3/1966 | Calvert | 260/880 |
| 3,270,650 | A | 9/1966 | Ernisse | 95/64 |
| 3,272,648 | A | 9/1966 | Yamamoto | 117/139.5 |
| 3,275,573 | A | 9/1966 | Vandenberg | 260/2 |
| 3,280,045 | A | 10/1966 | Vandenberg | 260/2 |
| 3,284,374 | A | 11/1966 | Daimon et al. | 260/2 |
| 3,297,783 | A | 1/1967 | Bailey | 260/836 |
| 3,324,091 | A | 6/1967 | Savides | 260/88.7 |
| 3,329,557 | A | 7/1967 | Magat et al. | 161/172 |
| 3,351,517 | A | 11/1967 | Willis | 161/184 |
| 3,354,138 | A | 11/1967 | Burr | 260/94.9 |
| 3,365,437 | A | 1/1968 | Marr et al. | 260/94.9 |
| 3,371,130 | A | 2/1968 | Seifert et al. | 260/897 |
| 3,381,019 | A | 4/1968 | Morehouse | 260/340.9 |
| 3,385,800 | A | 5/1968 | Furukawa et al. | 260/2 |
| 3,395,100 | A | 7/1968 | Fisher et al. | 252/8.8 |
| 3,396,125 | A | 8/1968 | Wofford et al. | 260/2 |
| 3,398,014 | A | 8/1968 | Turner | 117/111 |
| 3,399,150 | A | 8/1968 | Miyoshi et al. | 260/2 |
| 3,415,761 | A | 12/1968 | Vandenberg | 260/2 |
| 3,424,818 | A | 1/1969 | Hawley et al. | 260/836 |
| 3,425,981 | A | 2/1969 | Puletti et al. | 260/41 |
| 3,432,445 | A | 3/1969 | Oagan et al. | 260/2 |
| 3,441,521 | A | 4/1969 | Hsieh | 260/2 |
| 3,441,552 | A | 4/1969 | Rombusch et al. | 260/93.7 |
| 3,445,276 | A | 5/1969 | Pikula | 117/138.8 |
| 3,445,544 | A | 5/1969 | Schmitt | 260/876 |
| 3,446,651 | A | 5/1969 | Clachan et al. | 117/73 |
| 3,450,603 | A | 6/1969 | Meyers et al. | 203/18 |
| 3,450,794 | A | 6/1969 | Ebneth et al. | 260/876 |
| 3,453,347 | A | 7/1969 | Dreyfuss et al. | 260/896 |
| 3,454,494 | A | 7/1969 | Clark et al. | 252/8.8 |
| 3,457,197 | A | 7/1969 | Hsieh et al. | 260/2 |
| 3,468,702 | A | 9/1969 | Gallaugher et al. | 117/138.8 |
| 3,468,817 | A | 9/1969 | Hsieh | 260/2 |
| 3,468,860 | A | 9/1969 | Hsieh | 260/88.3 |
| 3,475,203 | A | 10/1969 | Clachan et al. | 117/138.8 |
| 3,484,388 | A | 12/1969 | Wofford | 260/2 |
| 3,485,773 | A | 12/1969 | Hershelman | 260/2 |
| 3,506,597 | A | 4/1970 | Asai et al. | 260/2 |
| 3,508,923 | A | 4/1970 | Pickard | 96/86 |
| 3,518,184 | A | 6/1970 | Potter | 252/8.75 |
| 3,536,634 | A | 10/1970 | Vandenberg | 260/2 |
| 3,536,936 | A | 10/1970 | Rubinstein et al. | 397/269 |
| 3,541,065 | A | 11/1970 | Elmer et al. | 260/88.3 |
| 3,563,794 | A | 2/1971 | Moriga | 117/138.8 |
| 3,575,903 | A | 4/1971 | Rombusch et al. | 260/23 |
| 3,591,563 | A | 7/1971 | Barie, Jr. et al. | 260/78 |
| 3,608,611 | A | 9/1971 | Oshima et al. | 159/47 |
| 3,625,915 | A | 12/1971 | Meurchin et al. | 260/41 R |
| 3,631,162 | A | 12/1971 | McGaugh et al. | 260/94.9 |

(List continued on next page.)

FOREIGN PATENT DOCUMENTS

| | | |
|---|---|---|
| CA | 837189 | 3/1970 |
| CH | 352828 | 3/1961 |
| DE | 597496 | 5/1934 |
| DE | 598952 | 6/1934 |
| DE | 613261 | 4/1935 |

(List continued on next page.)

OTHER PUBLICATIONS

Armstrong, R.D., et al., Lithium Ion Conducting Polymeric Electrolytes Based on Poly(Ethylene Adipate), *Electrochim. Acta*, 29, 1443–46 (1984).

Bannister, D.J., et al., Ionic Conductivities of Poly–(Methoxypolyethylene Glycol Monomethacrylate) Complexes with $LiSO_3CH_3$, *Polymer*, 25, 1600–02 (1984).

Blonsky, P.M., et al., Complex Formation and Ion Conductivity of Polyphosphazene Solid Electrolytes, *Solid State Ionics*, 18–19, 258–64 (1986).

(List continued on next page.)

*Primary Examiner*—Donald R. Wilson
(74) *Attorney, Agent, or Firm*—Brinks Hofer Gilson & Lione

(57) ABSTRACT

Thermoplastic and thermoset materials containing an effective amount of an antistatic agent for improving antistatic properties thereof, the antistatic agent is selected from homopolymers and copolymers of an epihalohydrin.

41 Claims, No Drawings

U.S. PATENT DOCUMENTS

| | | | |
|---|---|---|---|
| 3,639,267 A | 2/1972 | Vandenberg | 252/431 |
| 3,639,651 A | 2/1972 | Komuro et al. | 260/23.7 M |
| 3,640,908 A | 2/1972 | Vandenberg | 260/2 A |
| 3,642,667 A | 2/1972 | Steller | 260/2 A |
| 3,657,149 A | 4/1972 | Vandenberg | 252/431 R |
| 3,657,159 A | 4/1972 | Vandenberg | 260/2 EP |
| 3,657,393 A | 4/1972 | Komuro et al. | 260/887 |
| 3,658,766 A | 4/1972 | Kato et al. | 260/78 S |
| 3,660,010 A | 5/1972 | Georgoudis et al. | 8/115.6 |
| 3,674,893 A | 7/1972 | Nowak et al. | 260/836 |
| 3,686,120 A | 8/1972 | Creely | 252/8.8 |
| 3,704,225 A | 11/1972 | Shay | 252/8.9 |
| 3,745,116 A | 7/1973 | Brindell et al. | 252/1 |
| 3,766,091 A | 10/1973 | Vandenberg | 252/431 R |
| 3,766,106 A | 10/1973 | Yurimoto et al. | 260/17 A |
| 3,766,901 A | 10/1973 | Cleary et al. | 124/1 |
| 3,770,655 A | 11/1973 | Vandenberg | 252/431 N |
| 3,770,664 A | 11/1973 | Chono et al. | 260/2 A |
| 3,772,403 A | 11/1973 | Wells | 260/857 PG |
| 3,798,253 A | 3/1974 | Rick et al. | 260/448.2 |
| 3,850,818 A | 11/1974 | Katsumi et al. | 252/8.8 |
| 3,850,856 A | 11/1974 | Dreyfuss | 260/2 A |
| 3,850,857 A | 11/1974 | Dreyfuss | 260/2 A |
| 3,862,045 A | 1/1975 | Sato et al. | 252/8.75 |
| 3,864,426 A | 2/1975 | Salensky | 260/837 R |
| 3,873,369 A | 3/1975 | Crescentini et al. | 260/857 PG |
| 3,876,725 A | 4/1975 | Wells et al. | 260/858 |
| 3,882,190 A | 5/1975 | Wells | 260/857 PG |
| 3,887,644 A | 6/1975 | Wells | 260/857 PG |
| 3,896,101 A | 7/1975 | McIntosh et al. | 260/93.7 |
| 3,904,579 A | 9/1975 | Braddicks | 260/42.46 |
| 3,923,922 A | 12/1975 | Grant | 260/2.5 EP |
| 3,923,924 A | 12/1975 | Wells et al. | 260/830 P |
| 3,925,317 A | 12/1975 | Hsieh | 260/63 R |
| 3,933,871 A | 1/1976 | Armstrong | 260/401 |
| 3,936,422 A | 2/1976 | Wirth et al. | 260/45.95 N |
| 3,957,697 A | 5/1976 | Schlatzer | 260/2 A |
| 3,963,803 A | 6/1976 | Tanaka et al. | 260/873 |
| 4,035,441 A | 7/1977 | Endo et al. | 260/860 |
| 4,048,261 A | 9/1977 | Starmer | 260/888 |
| 4,051,196 A | 9/1977 | Wells et al. | 260/857 PG |
| 4,059,605 A | 11/1977 | Bennett | 260/448.2 B |
| 4,069,277 A | 1/1978 | Mathis et al. | 260/45.75 |
| 4,093,676 A | 6/1978 | Weipert et al. | 260/857 PG |
| 4,150,048 A | 4/1979 | Schilling | 260/448.2 B |
| 4,151,159 A | 4/1979 | Geall et al. | 260/42.46 |
| 4,154,344 A | 5/1979 | Yenni et al. | 206/524.6 |
| 4,159,975 A | 7/1979 | Praetorius et al. | 525/91 |
| 4,161,472 A | 7/1979 | Lehr | 525/4 |
| 4,165,303 A | 8/1979 | Schlossman et al. | 260/22 D |
| 4,200,701 A | 4/1980 | Wetton et al. | 525/4 |
| 4,230,604 A | 10/1980 | Wingrave | 252/518 |
| 4,230,827 A | 10/1980 | Myers | 525/121 |
| 4,250,280 A | 2/1981 | Tanaka et al. | 525/437 |
| 4,251,648 A | 2/1981 | Oetzel | 525/187 |
| 4,251,652 A | 2/1981 | Tanaka et al. | 528/279 |
| 4,258,173 A | 3/1981 | Schulz et al. | 528/168 |
| 4,268,595 A | 5/1981 | Katagiri et al. | 430/48 |
| 4,274,986 A | 6/1981 | Ikenaga et al. | 260/22 CQ |
| 4,280,948 A | 7/1981 | Dieck | 260/40 R |
| 4,291,134 A | 9/1981 | Hambrecht et al. | 525/92 |
| 4,303,748 A | 12/1981 | Armand et al. | 429/192 |
| 4,304,902 A | 12/1981 | Landoll | 528/419 |
| 4,314,040 A | 2/1982 | Castro et al. | 525/391 |
| 4,315,081 A | 2/1982 | Kobayashi et al. | 525/2 |
| 4,315,882 A | 2/1982 | Hiratsuka et al. | 264/171 |
| 4,352,868 A | 10/1982 | Skotheim | 429/111 |
| 4,357,401 A | 11/1982 | Andre et al. | 429/192 |
| 4,376,856 A | 3/1983 | Tanaka et al. | 528/292 |
| 4,379,913 A | 4/1983 | Waitkus | 528/300 |
| 4,384,078 A | 5/1983 | Ohya et al. | 525/296 |
| 4,408,013 A | 10/1983 | Barnhouse | 525/187 |
| RE31,468 E | 12/1983 | Hsu | 560/209 |
| 4,424,900 A | 1/1984 | Petcavich | 206/328 |
| 4,438,240 A | 3/1984 | Tanaka et al. | 525/420 |
| 4,440,898 A | 4/1984 | Pomplun et al. | 524/503 |
| 4,451,618 A | 5/1984 | Okamoto | 525/349 |
| 4,460,703 A | 7/1984 | Carville | 502/155 |
| 4,463,136 A | 7/1984 | Barnhouse | 525/187 |
| 4,466,912 A | 8/1984 | Phillips et al. | 252/512 |
| 4,471,037 A | 9/1984 | Bannister | 429/191 |
| 4,473,492 A | 9/1984 | Schmolka | 252/518 |
| 4,485,211 A | 11/1984 | Okamoto | 525/57 |
| 4,490,560 A | 12/1984 | Yu et al. | 568/614 |
| 4,500,687 A | 2/1985 | Wolfe | 525/412 |
| 4,507,465 A | 3/1985 | Chiba et al. | 528/312 |
| 4,511,742 A | 4/1985 | Yu | 568/614 |
| 4,542,179 A | 9/1985 | Falk et al. | 524/432 |
| 4,543,390 A | 9/1985 | Tanaka et al. | 525/63 |
| 4,556,614 A | 12/1985 | le Méhauté et al. | 429/191 |
| 4,556,616 A | 12/1985 | Armand et al. | 429/192 |
| 4,578,326 A | 3/1986 | Armand et al. | 429/192 |
| 4,582,781 A | 4/1986 | Chen | 430/527 |
| 4,587,309 A | 5/1986 | Tanaka et al. | 525/419 |
| 4,588,773 A | 5/1986 | Federl et al. | 525/64 |
| 4,610,955 A | 9/1986 | Chen | 430/527 |
| 4,617,325 A | 10/1986 | Knobel et al. | 521/105 |
| 4,618,630 A | 10/1986 | Knobel et al. | 521/105 |
| 4,620,944 A | 11/1986 | Armand et al. | 252/518 |
| 4,638,407 A | 1/1987 | Lundsgaard | 361/433 |
| 4,645,801 A | 2/1987 | Barnhouse | 525/404 |
| 4,654,279 A | 3/1987 | Bauer et al. | 429/192 |
| 4,654,417 A | 3/1987 | Inoue et al. | 528/416 |
| 4,656,246 A | 4/1987 | Chang et al. | 528/499 |
| 4,659,766 A | 4/1987 | Falk et al. | 524/504 |
| 4,661,211 A | 4/1987 | Petty-Weeks | 204/1 T |
| 4,661,560 A | 4/1987 | Abolins et al. | 525/68 |
| 4,661,561 A | 4/1987 | Abolins et al. | 525/68 |
| 4,663,103 A | 5/1987 | McCullough et al. | 264/40.4 |
| 4,680,358 A | 7/1987 | Yu | 526/292.9 |
| 4,683,181 A | 7/1987 | Armand et al. | 409/192 |
| 4,689,122 A | 8/1987 | Polak et al. | 204/1 T |
| 4,699,146 A | 10/1987 | Sieverding | 128/640 |
| 4,699,830 A | 10/1987 | White | 428/35 |
| 4,719,263 A | 1/1988 | Barnhouse et al. | 525/187 |
| 4,722,877 A | 2/1988 | Sammells | 429/192 |
| 4,722,978 A | 2/1988 | Yu | 525/403 |
| 4,738,882 A | 4/1988 | Rayford et al. | 428/35 |
| 4,743,476 A | 5/1988 | Miller | 427/430.1 |
| 4,764,425 A | 8/1988 | Balloni et al. | 428/331 |
| 4,764,428 A | 8/1988 | Gloyer | 428/402 |
| 4,774,356 A | 9/1988 | Inoue et al. | 560/224 |
| 4,775,716 A | 10/1988 | Kipouras et al. | 525/64 |
| 4,791,189 A | 12/1988 | Yu | 528/355 |
| 4,798,773 A | 1/1989 | Yasukawa et al. | 429/192 |
| 4,806,571 A | 2/1989 | Knobel et al. | 521/107 |
| 4,807,977 A | 2/1989 | Sammells | 350/357 |
| 4,828,927 A | 5/1989 | Timmerman et al. | 428/480 |
| 4,831,098 A | 5/1989 | Watanabe et al. | 528/45 |
| 4,847,332 A | 7/1989 | Yu | 525/398 |
| 4,857,590 A | 8/1989 | Gaggar et al. | 525/64 |
| 4,872,910 A | 10/1989 | Eshleman et al. | 106/3 |
| 4,902,743 A | 2/1990 | Boutni | 525/67 |
| 4,920,167 A | 4/1990 | Ruetman et al. | 524/155 |
| 4,931,506 A | 6/1990 | Yu | 525/187 |
| 5,010,139 A | 4/1991 | Yu | 525/187 |
| 5,023,036 A | 6/1991 | Lee et al. | 264/211.23 |

FOREIGN PATENT DOCUMENTS

| | | |
|---|---|---|
| DE | 616428 | 7/1935 |
| DE | 1109901 | 6/1961 |

| | | |
|---|---|---|
| DE | 1669835 | 1/1971 |
| DE | 1907024 | 4/1971 |
| DE | 2127654 | 6/1971 |
| DE | 2214219 | 10/1972 |
| EP | 0103296 | 3/1984 |
| EP | 0138389 | 4/1985 |
| EP | 0186321 | 7/1986 |
| EP | 0201097 | 12/1986 |
| EP | 0282985 | 9/1988 |
| EP | 0287092 | 10/1988 |
| EP | 0294722 | 12/1988 |
| FR | 1087092 | 8/1954 |
| FR | 1233850 | 5/1960 |
| FR | 1250926 | 12/1960 |
| FR | 1559479 | 1/1969 |
| GB | 346550 | 4/1931 |
| GB | 559020 | 2/1944 |
| GB | 747827 | 4/1956 |
| GB | 793065 | 4/1958 |
| GB | 799955 | 8/1958 |
| GB | 810385 | 3/1959 |
| GB | 897705 | 5/1962 |
| GB | 1254186 | 11/1971 |
| GB | 1338264 | 11/1973 |
| GB | 1515128 | 6/1978 |
| GB | 2139230 A | 11/1984 |
| GB | 2201154 A | 8/1988 |
| JP | 42-20843 | 10/1967 |
| JP | 42-020843 | 10/1967 |
| JP | 47-008776 | 3/1972 |
| JP | 4814651 | 2/1973 |
| JP | 48-066648 | 9/1973 |
| JP | 48-032769 | 10/1973 |
| JP | 49-023246 | 3/1974 |
| JP | 50-035259 | 4/1975 |
| JP | 50-124999 | 10/1975 |
| JP | 52-065216 | 5/1977 |
| JP | 52-102220 | 8/1977 |
| JP | 5730756 | 2/1982 |
| JP | 57202338 | 12/1982 |
| JP | 60-206865 | 10/1985 |
| JP | 62-249361 | 10/1987 |
| WO | 85/02718 | 6/1985 |
| WO | 91/09906 | 7/1991 |

OTHER PUBLICATIONS

Blonsky, P.M., et al., Polyphosphazene Solid Electrolytes, *J. Am. Chem. Soc.*, 106, 6854–55 (1984).

Chemical Abstracts 101: 131,705k (1984), abstract of L.K. Garifova et al., "Reducing the Static Charge of Poly(vinyl chloride) Films Using Certain Plasticizers," *Polim. Stroit. Mater.*, 1983, 12–13.

Encyclopedia of Polymer Science and Engineering, 13, (Wiley–Interscience, New York, 1988), pp. 708–15, "Radical Polymerization" ("Monomers" and "Component Reactions").

Fish, D., et al., Conductivity of Solid Complexes of Lithium Perchlorate with Poly{[ω–Methoxyhexa(Oxyethylene)–Ethoxy]Methylsiloxane}, *Makromol. Chem., Rapid Commun.*, 7, 115–20 (1986).

Linden, E., et al., Conductivity Measurements on Amorphous Peo Copolymers, *Solid State Ionics*, 28–30, 994–1000 (1988).

MacCallum, J.R., Eds., et al., Polymer Electrolyte Reviews, 1, (Elsevier, London, 1987).

Nagaoka, K., et al., High Ionic Conductivity in Poly(Dimethyl Siloxane–Co–Ethylene Oxide) Dissolving Lithium Perchlorate, *J. Polym. Sci., Polym. Lett. Ed.*, 22, 659–63 (1984).

Ratner, M.A., et al., Ion Transport in Solvent–Free Polymers, Chem. Rev., 88, 109–24 (1988).

Robitaille, C., et al., Thermal and Mechanical Properties of a Poly(Ethylene Oxide–b–Isoprene–b–Ethylene Oxide) Block Polymer Complexed with NaSCN, *Macromolecules*, 16, 665–71 (1983).

Tsuchida, E., et al., Lithium Ionic Conduction in Poly-(Methacrylic Acid)–Poly(Ethylene Oxide) Complex Containing Lithium Perchlorate, *Solid State Ionics*, 11, 227–33 (1983).

Watanabe, M., et al., Structure–Conductivity Relationship in Polymer Electrolytes Formed by Network Polymers From Poly[Dimethylsiloxane–g–Poly(Ethylene Oxide)] and Lithium Perchlorate, *J. Power Sources*, 20, 327–32 (1987).

Xia, D.W., et al., Conductivities of Solid Poylmer Electrolyte Complexes of Alkali Salts with Polymers of Methoxypolyethylene Glycol Methacrylates, *Solid State Ionics*, 14, 221–24 (1984).

Xia, D.W., et al., Solid Polymer Electrolyte Complexes of Polymethacrylates Carrying Pendant Oligo–Oxyethylene (Glyme) Chains, *J. Polym. Sci., Polym. Lett. Ed.*, 22, 617–621 (1984).

Borg–Warner, Brochure Blendex® Modifier Resins (1981).

Borg–Warner, Brochure CA–263, Blendex® Modifiers / Blendex® Modifier Resins and Their Use (1985).

Borg–Warner, Brochure CB–301A, Safety Information / Blendex® Modifier Resins (Aug. 1981).

Encylcopedia of Polymer Science and Engineering, vol. 1, p. 400 (1985).

GE Specialty Chemicals, Technical Guide BM–4003C, Blendex® Modifier Resins Product Guide (1989).

BFGoodrich "Hydrin (R) Elastomers" brochure HM–13.

Condensed Chemical Dictionary—Tenth Edition—Van Nortrand Reinhold Co.—1981 pp. 3.*

Kink–Othmer–Ency. of Chem. Tech.—Third Edition vol. 16 pp 442–445—1981.*

Berger, L.D., et al., *Ethylene Oxide Polymers*, Chapter 9, pp. 169–201 of R.L. Davidson, et al. Eds., "Water–Soluble Resins" (Reinhold Publishing Corp., N.Y., (1962).

FBGoodrich Co., "Electrical Conductivity with Hydrin Elastomers" (1978).

BFGoodrich, "Hydrin Elastomers", p. 20.

The BFGoodrich Company, Chemical Group, Hydrin (R) Elastomers—Hydrin Rubber as a Rigid Vinyl Antistat, JPB 83–08 (1983).

The BFGoodrich Company, Chemical Group, Hydrin (R) Elastomers—Hydrin Rubber as a Flexible PVC Antistat, JPB 83–09 (1983).

Dreyfuss, P., Polyether Modifiers for Polyvinyl Chloride and Chlorinated Polyvinyl Chloride, Advances in Chemistry Series, No. 128, Polymerization Kinetics and Technology (American Chemical Society, 1973).

* cited by examiner

ANTISTATIC PLASTIC MATERIALS CONTAINING EPIHALOHYDRIN POLYMERS

BACKGROUND OF THE INVENTION

When formed into such articles as molded objects or films, synthetic polymers are known to generate and accumulate electrostatic charges. When charged, such objects tend to accumulate concentrations of dirt and soil which are unsightly in appearance and interfere with the use of such objects. When nylon or polyester polymers are formed into fibers, the electrostatic charges create processing problems whereas in consumer use, carpeting made from such synthetic fibers has a tendency to generate annoying shocks in cold, dry weather, while in apparel, the charged fabric clings embarassingly to the wearer and shocks the wearer when the garment is being removed. Furthermore, such garments have an increased tendency to attract lint and soil.

The problem of electrostatic charge and arcing that it can create, is also of great concern in clean rooms, such as hospital surgery rooms, as well as chemical plants and laboratories, and electronic equipment, in particular. Arcing due to an electrostatic charge can cause an explosion or can damage electronic equipment.

To overcome the static electricity problem, topical antistats have been used to eliminate the electrical charges, however, such treatments have proven to be of little benefit in the consumer applications due to lack of permanency. Other methods used to reduce the electrostatic charges included copolymerization of monomers containing ionizable groups, surface grafted polymerization of antistatic monomers, inclusion of metallic fibers or carbon-coated filaments, incorporation of an antistatic additive in the matrix polymer, and the like.

The prior art is replete with teachings to reduce antistatic charges in various polymeric structures. Certain prior art patents describe the incorporation of antistatic materials in various polymeric structures which are used to mold or extrude rigid objects such as luggage, protective covers, and automobile parts. There is also a vast body of prior art patent literature directed to the elimination of the static charges in fiber and films.

SUMMARY OF THE INVENTION

This invention is directed to plastic materials, which include thermoplastic compositions and thermosets, containing an effective amount of an epihalohydrin-containing polymer as an antistatic agent. Examples of thermoplastic materials include polymers of acrylonitrile, butadiene, and styrene, also known as ABS polymers; polyamides or nylons; polyesters; polyvinyl chloride; chlorinated polyvinyl chloride; and polycarbonates. Examples of thermosetting materials include epoxy and phenolic resins. The plastic materials contain 1 to 50 weight parts of an epihalohydrin polymer antistatic agent per 100 weight parts of the plastic material.

DETAILED DESCRIPTION OF THE INVENTION

The deleterious effects of electrostatic charge is reduced or eliminated by inclusion in a plastic material an epihalohydrin antistatic agent selected from epihalohydrin homopolymers and epihalohydrin copolymers. An effective amount of the antistatic agent is used in the plastic material to induce charge dissipation by at least 50% in less than 10 seconds on application of 1000 volts of direct current at 23.5° C. and 50% Relative humidity. More specifically, the antistatic agent can be used in amount of 1 to 50 weight parts, preferably 2 to 30 weight parts, per 100 weight parts of the plastic material. Therefore the plastic material comprises between 67 and 99 weight percent of the composition and the antistatic agent comprises between 1 and 33 weight percent of the composition.

The antistatic agent can be in liquid or solid form. When in liquid form, it can be blended with the solid plastic material by mixing the two materials together until the plastic material absorbs the liquid antistatic agent. When the antistatic agent is in a solid form, such as powder, it is mixed with the plastic material until it is uniformly distributed throughout the plastic material. It should be apparent that the antistatic agent becomes an integral part of the plastic material after it is molded, however, it can also be used as a surface treatment therefor.

The Dreyfuss U.S. Pat. No. 3,850,856 and 3,850,857 disclose commercially available liquid epihalohydrin polymers prepared by cationic ring-opening polymerization. The epihalohydrin polymers disclosed in these patents can be used as antistatic agents in the manner described herein. The '857 Dreyfus patent discloses a process for polymerizing an epihalohydrin using as a catalyst a trialkyloxonium salt of an $HMF_6$ acid where M is a Group V element selected from phosphorous, arsenic, and antimony. The '856 Dreyfuss patent discloses an improvement over the '857 patent wherein polymerization of an epihalohydrin is carried out in the presence of water or ethylene glycol. The resulting polymers of an epihalohydrin prepared pursuant to the Dreyfuss patent '856 have hydroxyl termination. Any of the other alkylene glycols can also provide hydroxyl termination.

The liquid antistatic agents referred to herein have Brookfield viscosity below 16,000,000 cps at 25° C. More specifically, such liquid polymers or antistatic agents have viscosity measured at 25° C. in the range of 100 to 10,000,000 cps, preferably 200 to 2,000,000 cps and have number average molecular weight of 200 to 30,000, preferably 300 to 15,000, as determined by gel permeation chromatography using polystyrene as the calibration standard.

Solid epihalohydrin polymers are also well known commercial elastomers which can also be used as antistatic agents. A particularly useful class of these materials are copolymers of an epihalohydrin and an alkylene oxide. These copolymers are readily prepared by polymerization in mass or solution with catalysts normally formed by reacting an organoaluminum compound with water, and optionally, with a small amount of a chelating agent. These copolymers normally have a number average molecular weight greater than about 30,000, preferably in excess of 60,000, as determined by gel permeation chromatography. The Oetzel U.S. Pat. No. 4,251,648 describes such solid polymers of epihalohydrin also containing an unsaturated epoxy comonomer which makes it possible to cure such copolymers with an organic peroxide.

The epihalohydrin monomers useful in preparing polymeric epihalohydrin antistatic agents of this invention include epichlorohydrin, epibromohydrin, epiiodohydrin, and epifluorohydrin, although eipchlorohydrin is preferred. The antistatic agents include the epihalohydrin homopolymers and copolymers thereof with one or more comonomers selected from 1,2-epoxide monomers, particularly alkyl glycidyl ethers and oxirane-containing monomers or alkylene oxides of 2 to 6 carbon atoms, particularly ethylene oxide and propylene oxide and mixtures thereof. In these copolymers, amount of an epihalohydrin can vary from about 5 to 95 weight parts whereas one or more of the comonomers are used in an amount of 95 to 5 weight parts. Particularly preferred copolymers are solid, as in powder form, consisting of 5 to 95 weight parts epihalohydrin, preferably 10 to 60 weight parts, with 95 to 5 weight parts, preferably 90 to 40 weight parts, of one or more comonomers, such as ethylene oxide or propylene oxide, all on the basis of a total of 100 weight parts. Based upon these weight percentages, the ratio by weight of the epihalohydrin to the oxirane-containing monomer is from about 1:19 to about 1:1. The presence of an epihalohydrin in the antistatic agent appears to improve compatibility between the antistatic agent and the plastic material with which it is blended.

Other antistatic agents can also be included in the plastic compositions, along with the antistatic agents already described. Some examples of such other antistatic agents include long chain and ethoxylated amines and amides, and quarternary ammonium salts.

The plastic materials are generally divided into thermoplastics and thermosets. This invention is generally directed to imparting antistatic character to plastic materials, including engineered plastics. Thermosetting resins are those in which a heat-stable crosslinked polymer network extends throughout the finished fabricated article. This is in contrast to thermoplastics, which can be made to soften and flow by the application of heat.

As already noted, the plastic materials can be modified with an antistatic agent in order to impart antistatic character thereto. Whether the antistatic agent is liquid or in solid form, the object of the invention herein is attained by mixing the antistatic agent with a suitable plastic material until the materials are uniformly dispersed. Examples of suitable thermoplastic materials include ABS polymers, polyvinyl chloride, chlorinated polyvinyl chloride, nylons and polyamides, polycarbonates, and polyesters. Examples of thermosetting materials include epoxies and phenolics.

Acrylonitrile-butadiene-styrene (ABS) copolymers have a wide variety of compositions, preparation conditions, and properties. The copolymers are typically tough and rigid, easy to extrude or mold, and have good abrasion resistance. ABS copolymers have a rubber substrate and a rigid phase. Generally, the rigid phase includes acrylonitrides and vinyl aromatic compounds. The vinyl aromatic compounds can include components such as styrene. The ABS copolymer is composed of up to about 60 weight percent of the rubber substrate and at least 40 weight percent of the acrylonitride and vinyl aromatic. They can be blended with other polymers, especially with poly(vinyl chloride), and can be shaped by almost any plastics-fabrication process: injection molding, extrusion, or thermoforming. They are used in many automotive, marine and communication applications. In building products, they are used for pipes, ducts, and structural foam.

Proportions of monomers normally used to make ABS copolymers are about 40 to 90% of combined acrylonitrile and styrene, with about 60 to 10 parts of butadiene. Butadiene is the rubber substrate of the ABS copolymer. The amount of acrylonitrile is preferably from about 10 to 60% by weight. Blends of ABS copolymers with other polymers such as vinyl chloride polymers, styrene polymers, methyl methacrylate polymers, polyurethanes, polycarbonates, and the like may also be used. Any ABS copolymer that can be extruded or molded can be used in accordance with this invention.

Vinyl chloride polymers are produced in two main types, homopolymers and copolymers, usually with vinyl acetate or one or more other polymerizable olefinic monomers having at least one terminal $CH_2$=C<group. Both types can be plasticized by a wide variety of plasticizers, usually esters. Rigid or unplasticized PVC is used extensively for pipe. The plasticized material is used largely in floor coverings. The homopolymer itself is inherently fire resistant, but addition of plasticizers, unless they are especially fire resistant, considerably reduces this characteristic.

Rigid polyvinyl chloride is a low cost thermoplastic material having in combination, good impact strength, good moldability, low weight, and resistance to combustion, corrosion and attack by acids. For these reasons, it has found wide application in products such as building panels, pipes, pipe fittings, ducts, blown bottles and the like, which are made from rigid vinyl polymer compounds by extrusion, calendering or molding. To make polyvinyl chloride suitable for fabrication by these methods, it is necessary to add to it one or more stabilizers, lubricants, pigments and polymer modifiers.

The chlorinated polyvinyl chloride employed in the present invention can be readily prepared by the post-chlorination of commercially available polyvinyl chloride. Prior to post-chlorination, the polyvinyl chloride generally has a chlorine content of about 56.7% by weight, a glass transition temperature of from about 75° to 80° C., and a density of about 1.40 grams per cubic centimeter. Polyvinyl chloride can be post-chlorinated by a number of procedures including chlorination in a solution; chlorination in an aqueous suspension, or a suspension in a swelling agent; and direct chlorination of dry, polyvinyl chloride powder.

Chlorinated polyvinyl chloride is generally defined as having a minimum chlorine content of at least 60% by weight, and for practical purposes, a maximum chlorine content of about 75%. In a preferred embodiment, chlorinated polyvinyl chloride has a chlorine content of about 64 to 73%.

The glass transition temperature (Tg) is that temperature below which a polymer remains hard and glassy as opposed to soft and rubbery. The glass transition temperature of chlorinated polyvinyl chloride increases with increasing chlorine content. Polyvinyl chloride itself has a glass transition temperature of about 75°–80° C., while typical glass transition temperatures for chlorinated polyvinyl chloride suitable for the present invention are about 87° C. for 60% chlorine content, about 106° C. for 64% chlorine content, about 128° C. for 68% chlorine content, and about 178° C. for 75% chlorine content.

Chlorinated polyvinyl chloride can be a homopolymer or a copolymer thereof with a minor amount of one or more copolymerizable monomers. Generally, up to about 20% by weight of the vinyl chloride can be replaced by one or more of copolymerizable monomers, such as monoolefinic copolymerizable monomers.

Nylon is a generic name for any long-chain, synthetic, polymeric amides in which recurring amide groups are integral with the main polymer chain. There is a wide choice of starting materials from which polyamides can be synthesized. The two primary mechanisms for polyamide manufacture are condensation of a diamine and a dibasic acid, or their equivalents, or polymerization of cyclic monomers.

Polycarbonates are a special class of polyesters derived from the reaction of carbonic acid derivatives with aromatic, aliphatic, or mixed diols. They can be produced by reacting phosgene with a diol in the presence of an appropriate hydrogen chloride acceptor, or by melt transesterification reaction of a diol and a carbonate ester. The three dihydrobenzenes, i.e., hydroquinone, resorcinol, and catechol, can react with phosgene in pyridine. Hydroquinone and resorcinol yield polymers whereas catechol produces a cyclic carbonate. Diethylene glycol chloroformate can be reacted with allyl alcohol to yield a polycarbonate that is highly crosslinked, colorless, scratch-resistant and transparent which is used in optical applications. Aromatic polycarbonates are highly stable to heat, are mechanically tough, transparent engineering thermoplastics.

Polycarbonates are frequently employed as lightweight, break-resistant glass substitutes in light-transmission applications. An example of such an application is transparent canopies for high-speed aircraft. The high impact strength combined with transparency and high flexural strength, make polycarbonate sheet a candidate for bullet-resistant glazing.

Thermoplastic polyesters are condensation products that are characterized by many ester linkages distributed along the polymer backbone. The first of this class to be commercialized was poly(ethylene terephthalate). It was introduced in 1953 as a textile fiber and soon thereafter in film form. In 1966, the first injection-molding grades of poly(ethylene terephthalate) were introduced, but recent injection-molding grades of modified poly(ethylene terephthalate) show improvements over the earlier materials. Poly(butylene terephthalate), also is referred to as poly(tetramethylene terephthalate), was first introduced commercially in 1970. Early injection-molding grades included nonreinforced, glass-reinforced, and flame-retardant products. It is characterized by excellent mold flow and short molding cycles with excellent chemical resistance and performance at elevated temperature.

Thermoset polyesters are macromolecules with polyester backbones derived from the interaction of unsaturated acids or anhydrides and polyhydric alcohols. The reaction normally proceeds at 190–220° C. until a predetermined acid value-viscosity relationship has been achieved. Solutions of these polymers in vinyl monomers, such as styrene, often are called polyester resins. They are compounded with fillers or fibers, or both, in the liquid stage and then are cured with the aid of free-radical initiators to yield thermoset articles. Market penetration, especially in the area of fiber-glass reinforcement, is greatly enhanced as a result of greater latitudes in compounding and processing than is possible with other polymeric systems. Thermoset polyesters can be mass-cast, laminated, molded, pultruded, and made into gel coats in a variety of colors. Depending on the application, the physical and chemical properties of the product often can be met by judicious choice of polyester backbone ingredients and the type and amount of the diluent vinyl monomer.

The epoxy resins are thermosetting polyethers which can be made by condensing an epihalohydrin, particularly epichlorohydrin, with a polyhydric phenol in the presence of an alkali. The phenol can be diphenylolpropane or bisphenol A. An excess of an epihalohydrin is used to insure the presence of epoxide groups on the ends of the polymer chains.

The epoxy resins have limited application in the uncured state. Curing reactions involve the hydroxyl groups along the chain and the epoxy end groups. Curing agents include thermosetting resins with methylol groups present, fatty acids or acid anhydrides, and amines or other nitrogen compounds. Amines are the preferred curing agents. The cured resins have good flexibility, adhesion, and chemical resistance.

The chief commercial use of the epoxide resins is in surface coatings. They can be combined with phenolic resins for use in the internal coating of food cans or in ware enamels, or with urea resins to give white enamels. Other uses of the epoxy resins include casting or potting resins for embedding electrical components, low pressure laminates, usually with glass fibers, adhesives, and stabilizers for vinyl resins.

Phenolic thermosetting resins have been known for a long time. Phenols react with aldehydes to give condensation products if there are free positions on the benzene ring ortho and para to the hydroxyl group. Formaldehyde is by far the most reactive aldehyde and is used almost exclusively in commercial production. The reaction is always catalyzed either by acids or bases. The nature of the product is greatly dependent on the type of catalysts used. Urea-formaldehyde and melamine-formaldehyde resins are also included in this category.

The first products of the alkali-catalyzed reaction between a phenol and formaldehyde are known as resoles. If all three of the ortho and para positions in the phenol are free to react, crosslinked materials are quickly formed. The reactions are normally separated into three known phases of A-stage, B-stage, and C-stage. In the final stage of reaction or the C-stage, a great deal of crosslinking takes place and the resin becomes insoluble and infusible.

Phenolic resins are widely used as adhesives, for low pressure laminating, in varnishes, and in coatings.

Many of plastic materials described above are commercial and are readily available. They can be modified by incorporating therein an effective amount of an antistatic agent in order to impart thereto antistatic character, as well as other conventional additives. Such modified plastic materials can then be used to make a great variety of articles such as carpeting, luggage, protective covers, automobile parts, and the like.

In preparing samples for testing in examples that follow, a Brabender mixer with a cam head was used. The maximum temperature used for the various plastic materials was as follows:

ABS—180° C.

PVC—160° C.

CPVC—180° C.

SAN®—180° C

For a fuller understanding of the nature and advantages of this invention, reference may be had to the following examples. These examples are given merely to illustrate the invention and are not to be construed in a limiting sense.

EXAMPLE 1

This example demonstrates testing of the PVC plastic material "A" by incorporating therein various amounts of antistatic agents and then testing the modified PVC plastic materials for antistatic properties. PVC "A" was a PVC dispersion resin with intrinsic viscosity of 1.20, bulk density of about 315–400 kg/m3, and particle size of 100% through 200 mesh screen. The antistatic agents used were a homopolymer of epichlorohydrin, identified in Table I as "Homopolymer ECH" and a copolymer of epichlorohydrin, identified in Table I as "Copolymer ECH". Homopolymer ECH has Tg of −25° C., a chlorine content of about 37%, and Mooney viscosity of 90 (1+4 @100° C.). Copolymer ECH 65/35 is a copolymer of epichlorohydrin and ethylene oxide in respective weight ratio of 65/35, with a Tg of −42° C., chlorine content of 25%, and Mooney viscosity of 90 (1+4 @100° C.).

The samples #1 to #5 were prepared by initially adding the plastic material to the mixer and mixing it for one minute followed by addition of the antistatic agent, which was followed by additional mixing of two minutes. Processing aids were also admixed, where indicated. The soft plastic mass was then removed and cold-pressed between chrome steel plates to a thickness of about 2 millimeters until it was rigid. Testing was conducted with a Monroe #276A Statotester whereas other tests were run pursuant to the ASTM methods. Compositions of test samples and test results are summarized in Table I, below:

TABLE I

| Samples | 1 | 2 | 3 | 4 | 5 |
|---|---|---|---|---|---|
| PVC "A" | 100 | 100 | 100 | 100 | 100 |
| Homopolymer ECH | | 5 | 10 | | |
| Copolymer ECH 65/35 | | | | 5 | 10 |
| "Static Tester" 900 Volts for 1 min. R.T., 50% RH | | | | | |
| Volts @ 15 sec. | 465 | 270 | 120 | 160 | 160 |
| Volts @ 30 sec. | 290 | 150 | 20 | 60 | 55 |
| Volts @ 60 sec. | 150 | 20 | 20 | 20 | 20 |
| Tensile, MPa. | 41.4 | 42.7 | 36.5 | 41.4 | 40.0 |
| Elongation, % | 10 | 20 | 70 | 50 | 60 |
| Hardness, D | 78 | 78 | 78 | 78 | 76 |
| Stiffness (ASTM D-747) 5.08 cm. span, 7.27 kg. load | | | | | |
| 3° | 6 | 7 | 5 | 9 | 9 |
| 6° | 14 | 16 | 9 | 19 | 19 |
| 12° | 30 | 33 | 19 | 39 | 37 |
| 18° | 44 | 49 | 27 | 57 | 54 |
| 24° | 57 | 61 | 33 | 72 | 68 |
| 30° | 67 | 70 | 37 | 81 | 76 |
| Surface Resistance @ 500 Volts, ohm-cm × $10^{10}$ | | | | | |
| | 290 | 5.2 | 1.2 | 73 | 150 |

Examination of the results in Table I indicates the substantial improvement in static dissipation with an increase in the level of antistatic agents. It is also apparent that the improvement in the antistatic properties of the plastic materials is not accompanied by any significant loss of physical properties.

EXAMPLE 2

This example demonstrates the incorporation of antistatic agents Homopolymer ECH and Copolymer ECH 65/35, referred to in Ex. 1, and Copolymer ECH 20/80 into a chlorinated PVC, styrene-acrylonitrile, and ABS copolymer. Copolymer ECH 20/80 is a copolymer of epichlorohydrin and ethylene oxide in the respective weight ratio of 20/80 having Tg of −52° C. and chlorine content of 9.0%. The chlorinated PVC (CPVC) used had chlorine content of 67%; the styrene-acrylonitrile (SAN) plastic material used was SAN 880; and the ABS copolymer was a copolymer of acrylonitrile, butadiene, and styrene identified as Blendex 131.

The samples of the thermoplastic materials, referred to above, were prepared by blending same with the antistatic polymeric agents and the samples were then tested in the manner described in Ex. 1. Composition of the test samples and test results are given in Table II.

TABLE II

| Samples | 1 | 2 | 3 | 4 | 5 | 6 |
|---|---|---|---|---|---|---|
| CPVC | 100 | 100 | — | — | — | — |
| SAN 880 | — | — | 100 | — | — | — |
| Blendex 131 | — | — | — | 100 | 100 | 100 |
| Copolymer ECH 65/35 | — | 7.0 | 10 | 10 | — | — |
| Copolymer ECH 20/80 | — | — | — | — | 6.0 | — |
| Static Tester | | | | | | |
| Volts @ 15 sec. | — | — | 760 | 520 | 1000 | 100 |
| Volts @ 30 sec. | — | — | 640 | 360 | 1000 | 40 |
| Volts @ 60 sec. | 820 | 695 | 525 | 220 | 1000 | 20 |

EXAMPLE 3

This example demonstrates the use of a typical rigid pipe compound identified as "PVC Pipe Compound", having the properties described in Table III.

The PVC plastic material was mixed with the electrostatic agents copolymer ECH 65/35 of Ex. 1 and Copolymer ECH 50/50 and tested in the manner described in Ex. 1. Copolymer ECH 65/35 is defined in Ex. 1 whereas Copolymer ECH 50/50 is a 50/50 copolymer of epichlorohydrin and ethylene oxide. Composition of the samples and test results are given in Table III, below:

TABLE III

| Samples | 1 | 2 | 3 | 4 | 5 | 6 | 7 |
|---|---|---|---|---|---|---|---|
| PVC Pipe Compound | 100 | 100 | 100 | 100 | 100 | 100 | 100 |
| Copolymer ECH 65/35 | — | 4 | 8 | — | — | — | — |
| Copolymer ECH 50/50 | — | — | — | 2 | 4 | 6 | 8 |
| Processing Procedure | 100 | 104 | 108 | 102 | 104 | 106 | 108 |
| Banbury Drop Temp., ° C. | 178 | 179 | 182 | 179 | 181 | 181 | 183 |
| Mill Roll Temp., ° C. | 172 | 172 | 172 | 172 | 172 | 172 | 172 |
| Mill Time, Min. | 4 | 4 | 4 | 4 | 4 | 4 | 4 |
| Press Conditions | 5 min. Preheat, 5 min. Press at 178° C. | | | | | | |
| Tensile Strength, MPa | 49.7 | 41.6 | 32.8 | 40.5 | 40.1 | 35.2 | 33.5 |
| Flexural Modulus, MPa | 3.67 | 3.19 | 2.67 | 3.27 | 2.87 | 2.72 | 2.58 |
| Izod Impact, J/cm | | | | | | | |
| 22° C., | 0.88 | 1.70 | 0.74 | 1.15 | 1.57 | 1.10 | 1.52 |
| −29° C., | 0.38 | 0.61 | 0.55 | 0.60 | 0.61 | 0.58 | 0.65 |
| STATIC ELECTRICITY TESTS | | | | | | | |
| Heat Distortion Temp. ° C. | 73 | 72.5 | 73 | 72.5 | 72.5 | 72 | 72 |
| D-H$_2$O Aged 24 hrs/ 100° C. | | | | | | | |
| % Weight Change | +1.07 | +1.55 | +2.43 | +1.94 | +2.20 | +2.99 | +3.05 |
| Static Tester, Volts (All tests at 23.6° C., 50% Relative Humidity) | | | | | | | |
| Original | | | | | | | |
| Max. Initial charge | 1250 | 1240 | 295* | 760 | 690 | 405* | 325* |
| After 1 min. Discharge | 1190 | 1070 | 0 | 0 | 0 | 0 | 0 |
| After Extensive Processing, Roll Temp. of 176° C., Stock Temp. of 196° C. | | | | | | | |
| 1 min. Mill Time | | | | | | | |
| Max. Initial Charge | — | — | 870 | 810 | — | — | 230 |
| After 1 min. Discharge | — | — | 5 | 30 | — | — | 20 |

TABLE III-continued

| Samples | 1 | 2 | 3 | 4 | 5 | 6 | 7 |
|---|---|---|---|---|---|---|---|
| 10 min. Mill Time | | | | | | | |
| Max. Initial Charge | — | — | 820 | 1020 | — | — | 310 |
| After 1 Min. Discharge | — | — | 60 | 820 | — | — | 30 |
| 20 min. Mill Time | | | | | | | |
| Max. Initial Charge | — | — | 1060 | 1120 | — | — | 690 |
| After 1 min. Discharge | — | — | 920 | 1050 | — | — | 60 |
| Ash Pickup (23.5° C., 50% Relative Humidity) | | | | | | | |
| Type of Pickup | Bad | Bad | None | None | None | None | None |

*immediate discharge

EXAMPLE 4

This example corresponds to Example 3 except white, flexible PVC compound was used having the properties given in Table IV. Samples 1 to 8 herein were mixed in a Banbury mixer by charging thereinto the masterbatch and the antistatic agent. Stearic acid in amount of 0.75 parts per 100 parts of the PVC plastic was added after addition of the antistatic agent was made, to improve handling. Mixing was conducted until stock temperature reached 163° C. Then, the mixture was placed on 160° C. rolls, mixed for 5 minutes and sheeted-off. There were no handling problems with any of these compounds.

Test results of the modified flexible PVC material are given in Table IV, below:

EXAMPLE 5

This example demonstrates the importance of the amount of antistatic agent incorporated into ABS copolymer. Copolymer ECH 20/80 and ABS copolymer are described in Example 2. The samples of ABS copolymer were prepared by blending same with the antistatic polymeric agent and the samples were then tested in the manner described in Example 1. Composition of the test samples and test results are given in Table V.

TABLE V

| Samples | 1 | 2 | 3 | 4 | 5 |
|---|---|---|---|---|---|
| Blendex 131 | 60 | 60 | 60 | 60 | 60 |
| Calcium Stearate | 1 | 1 | 1 | 1 | 1 |
| Copolymer ECH 20/80 | 0 | 1.5 | 3 | 6 | 9 |
| Static Tester, one minute charge | | | | | |
| Initial Voltage | 1000 | 1000 | 1000 | 1000 | 500[b] |
| T-1/2, sec[a] | [c] | 33 | 9.0 | 1.25 | 1 |

[a]Time to 50% decay
[b]Could not be charged to 1000 volts
[c]Infinity, the voltage dropped to 950 v in 5 minutes

EXAMPLE 6

This example demonstrates the incorporation of antistatic agents copolymer EBH, Copolymer ECH-PO 37/63 and copolymer ECH-PO 23/77 into an ABS plastic material described in Example 2. Copolymer EBH is a copolymer of epibromohydrin and ethylene oxide in the respective weight ratio of 15/85 having bromine content of 8.6 wt. %. Copolymerw ECH-PO 37/63 and 23/77 are copolymers of epichlorohydrin and propylene oxide in the respective weight ratios

TABLE IV

| Samples | 1 | 2 | 3 | 4 | 5 | 6 | 7 | 8 |
|---|---|---|---|---|---|---|---|---|
| Flexible PVC Compound | 100 | 100 | 100 | 100 | 100 | 100 | 100 | 100 |
| Copolymer ECH 65/35 | — | 4 | 7 | 10 | — | — | — | — |
| Copolymer ECH 50/50 | — | — | — | — | 2 | 4 | 6 | 8 |
| | 100 | 104 | 107 | 110 | 102 | 104 | 106 | 108 |
| PHR of Antistat Agent Added | 0 | 8.7 | 15.2 | 21.7 | 4.3 | 8.7 | 13 | 17.4 |
| Specific Gravity, g/cc | 1.421 | 1.417 | 1.413 | 1.409 | 1.419 | 1.417 | 1.412 | 1.410 |
| Stress-Strain Properties (Instron 50.8 cm/Min.), Samples Pressed | | | | | | | | |
| 100% Modulus, MPa | 8.82 | 8.62 | 7.86 | 7.38 | 8.55 | 7.93 | 7.79 | 7.93 |
| 200% Modulus, MPa | 11.86 | 11.51 | 10.48 | 9.79 | 11.58 | 10.62 | 10.34 | 10.41 |
| Tensile, MPa | 13.51 | 14.00 | 12.06 | 12.07 | 13.44 | 12.34 | 11.58 | 12.41 |
| Elongation, % | 280 | 330 | 280 | 260 | 290 | 280 | 280 | 290 |
| Hardness A | 90 | 87 | 86 | 87 | 87 | 87 | 85 | 85 |
| Hardness D | 47 | 35 | 33 | 30 | 30 | 30 | 30 | 30 |
| Static Tester, Volts (All tests at 23.5° C., 50% Relative Humidity) | | | | | | | | |
| Original | | | | | | | | |
| Max, Initial Charge | 1330 | 1290 | 1110 | 680 | 1140 | 1050 | 1120 | 570 |
| After 1 min. Discharge | 90 | 0 | 0 | 0 | 0 | 0 | 0 | 0 |
| After Extensive Processing (Mill mixed @ 20 min./171° C.) | | | | | | | | |
| Max. Initial Charge | NT | 1370 | 1180 | 810 | 1170 | 990 | 1140 | 660 |
| After 1 min. Discharge | NT | 0 | 0 | 0 | 0 | 0 | 0 | 0 |
| Electrical Properties (all Data at 23.5° C., 50% Relative Humidity) | | | | | | | | |
| Volume Resistivity, ohm-cm × $10^{-10}$ | 455 | 66.5 | 10.6 | 3.9 | 54.8 | 14.8 | 4.4 | 1.2 |
| Dielectric Constant at 1000 Hz. | 5.76 | 6.16 | 6.59 | 6.49 | 6.32 | 6.76 | 7.11 | 7.73 |
| Power Factor at 1000 Hz. | .0900 | .1103 | .1400 | .1470 | .1050 | .1320 | .1670 | .2020 | of 37/63 and 23/77 having respective chlorine contents of 14.3% and 8.9% on weight basis.

The samples of ABS plastic materials were prepared by blending same with the antistatic polymeric agents and the samples were then tested in the manner described in Example 1. Composition of the test samples and test results are given in Table VI.

TABLE VI

| Samples | 1 | 2 | 3 | 4 | 5 |
|---|---|---|---|---|---|
| Blendex 131 | 60 | 60 | 60 | 60 | 60 |
| Calcium Stearate | 1 | 1 | 1 | 1 | 1 |
| Copolymer EBH | 0 | 6 | 0 | 0 | 0 |
| Copolymer ECH-PO 37/63 | 0 | 0 | 6 | 0 | 0 |
| Copolymer ECH-PO 23/77 | 0 | 0 | 0 | 6 | 0 |
| Homopolymer ECH | 0 | 0 | 0 | 0 | 6 |
| Static Tester - one minute charge | | | | | |
| Initial Voltage | 1000 | 1000 | 1000 | 1000 | 1000 |
| T-1/2, sec$^a$ | | $^b$ | 1.2 | 70 | 62 | 129 |

$^a$Time to 50% decay
$^b$Infinity, the voltage dropped to 950 V in 5 minutes

EXAMPLE 7

This example demonstrates the use of antistatic agents described herein in two commercial polyamide resins identified as Nylon Capron 5526 and Nylon Capron 5556, and an epoxy resin with an EEW of 190. The polyamide resins are examples of thermoplastic materials whereas the epoxy resin is an example of thermosetting materials. The antistatic agent was Copolymer ECH 20/80, earlier identified as a 20/80 copolymer of epichlorohydrin and ethylene oxide. Composition of test samples and test results are summarized in Table VII, below.

TABLE VII

| Samples | 1 | 2 | 3 | 4 | 5 | 6 |
|---|---|---|---|---|---|---|
| Nylon Capron 5526 | 100 | 100 | — | — | — | — |
| Nylon Capron 5556 | — | — | 100 | 100 | — | — |
| Copolymer ECH 2080 | — | 10 | — | 10 | 5 | 10 |
| Epoxy Resin | — | — | — | — | 100 | 100 |
| Static tester — charged to 1000 volts DC for 1 minute; RT, 50% | | | | | | |
| RH, (time in seconds to decay to indicated voltage) | | | | | | |
| 500 volts | 1.0 | ** | 1.0 | 0.8 | 5 | 2.5 |
| 368 volts | 1.4 | ** | 1.3 | 1.2 | 21 | 7.0 |
| 250 volts | | | 0.5 | | | |
| 184 volts | | | 0.8 | | | |

*Liquid Diglycydal ether of bisphenol A (EEW) 190
**Sample could not be charged to 1000 volts

What is claimed is:

1. A composition of matter comprising a plastic material and an effective amount, but 20% or less by weight, of an antistatic agent distributed throughout said plastic material to improve antistatic properties of said plastic material,
   (a) wherein said plastic material is a graft copolymer consisting of acrylonitrile, butadiene, and styrene; and
   (b) wherein said antistatic agent is a copolymer comprising from about 50% to about 95% by weight ethylene oxide and from about 5% to about 50% by weight epichlorohydrin.

2. The composition of claim 1 wherein the amount of said antistatic agent is from 2 to 20 weight parts per 100 parts of said plastic material.

3. The composition of claim 2 wherein the antistatic agent is in solid form and has number average molecular weight in excess of about 60,000.

4. The composition of claim 3 wherein the plastic material consists of 40 to 90 weight parts of acrylonitrile and styrene together, and 60 to 10 weight parts of butadiene, based on 100 weight parts of said plastic material; and wherein said plastic material can be extruded or molded.

5. The composition of claim 4 wherein the amount of acrylonitrile in said plastic material is 10 to 60 weight parts.

6. An antistatic thermoplastic composition comprising:
   (A) 80% or more by weight of a copolymer having a diene rubber substrate and a rigid phase, said rigid phase consisting of an acrylonitrile and a vinyl aromatic compound; and
   (B) 20% or less by weight of an epihalohydrin copolymer of an epihalohydrin and an oxirane-containing comonomer, wherein the ratio by weight of said epihalohydrin to said oxirane comonomer is from 1:19 to 1:1;
wherein said epihalohydrin copolymer is present in an amount such that said antistatic thermoplastic composition has improved antistatic properties in comparison to said antistatic thermoplastic composition wherein said epihalohydrin copolymer is absent.

7. The composition of claim 6 wherein said copolymer of claim 6,(A) consists essentially of an ABS graft copolymer.

8. The composition of claim 6 wherein the copolymer of claim 6,(A) consists of at least 40% by weight of a combination of a vinyl aromatic compound and an acrylonitrile compound, and up to 60% by weight of a rubber substrate.

9. The composition of claim 6 wherein the epihalohydrin is copolymerized with an alkylene oxide.

10. The composition of claim 9 wherein the alkylene oxide is selected from the group consisting of ethylene oxide, propylene oxide and mixtures thereof.

11. The composition of claim 6 wherein the epihalohydrin is epichlorohydrin.

12. The composition of claim 6 wherein component 34,(A) is present in an amount equal to or less than 98% by weight, and said epihalohydrin copolymer is present in an amount equal to or more than 2% by weight.

13. The composition of claim 12 wherein component 34,(A) is present in an amount equal to or less than 95% by weight, and said epihalohydrin copolymer is present in an amount equal to or more than 5% by weight.

14. The composition of claim 13 wherein component 34,(A) is present in an amount equal to or less than 90% by weight, and said epihalohydrin copolymer is present in an amount equal to or more than 10% by weight.

15. The composition of claim 6 wherein the ratio by weight of said epihalohydrin to said oxirane comonomer is equal to or less than 2:8.

16. The composition of claim 6 wherein the oxirane-containing comonomer is ethylene oxide.

17. The composition of claim 6 wherein the epihalohydrin copolymer is in solid form and has a number average molecular weight in excess of about 60,000, and wherein said epihalohydrin is selected from the group consisting of epichlorohydrin and epibromohydrin.

18. An antistatic thermoplastic composition comprising:
   (A) between 80 and 99% by weight of a graft copolymer consisting of acrylonitrile, butadiene and styrene; and
   (B) between 1 and 20% by weight of an epihalohydrin copolymer of an epihalohydrin and an oxirane-containing comonomer, wherein the epihalohydrin copolymer contains between 5 and 50% by weight epihalohydrin;
wherein said epihalohydrin copolymer is present in an amount such that said antistatic thermoplastic composition has improved antistatic properties in comparison to said antistatic thermoplastic composition wherein said epihalohydrin copolymer is absent.

19. The composition of claim 18 wherein the copolymer of acrylonitrile, butadiene, and styrene is present at between 80 and 98% by weight and the epihalohydrin polymer is present at between 2 and 20% by weight.

20. The composition of claim 18 wherein the oxirane-containing comonomer is ethylene oxide.

21. The composition of claim 18 wherein the epihalohydrin copolymer is in solid form and has a number average molecular weight in excess of about 60,000, and wherein said epihalohydrin is selected from the group consisting of epichlorohydrin and epibromohydrin.

22. An antistatic thermoplastic composition comprising:
   (A) between 80 and 99% by weight of a graft copolymer consisting of acrylonitrile, butadiene, and styrene; and
   (B) between 1 and 20% by weight of an epihalohydrin copolymer of an epihalohydrin and an oxirane-containing comonomer, wherein the epihalohydrin copolymer contains between 15% and 30% by weight epihalohydrin;
wherein said epihalohydrin copolymer is present in an amount such that said antistatic thermoplastic composition has improved antistatic properties in comparison to said antistatic thermoplastic composition wherein said epihalohydrin copolymer is absent.

23. The composition of claim 22 wherein the oxirane-containing comonomer is ethylene oxide.

24. The composition of claim 22 wherein the epihalohydrin copolymer is in solid form and has a number average molecular weight in excess of about 60,000, and wherein said epihalohydrin is selected from the group consisting of epichlorohydrin and epibromohydrin.

25. An antistatic thermoplastic composition comprising:
   (A) 80% or more by weight of a copolymer, said copolymer consisting of an acrylonitrile and a vinyl aromatic compound, grafted to diene rubber substrate; and
   (B) 20% or less by weight of an epihalohydrin copolymer of an epihalohydrin and an oxirane-containing comonomer, wherein the ratio by weight of said epihalohydrin to said oxirane comonomer is from 1:19 to 1:1;
wherein said epihalohydrin copolymer is present in an amount such that said antistatic thermoplastic composition has improved antistatic properties in comparison to said antistatic thermoplastic composition wherein said epihalohydrin copolymer is absent.

26. The composition of claim 25 wherein said copolymer of claim 25,(A) consists essentially of an ABS graft copolymer.

27. The composition of claim 25 wherein the copolymer of claim 25,(A) consists of at least 40% by weight of a combination of a vinyl aromatic compound and an acrylonitrile compound, and up to 60% by weight of a rubber substrate.

28. The composition of claim 25 wherein the epihalohydrin is copolymerized with an alkylene oxide.

29. The composition of claim 28 wherein the alkylene oxide is selected from the group consisting of ethylene oxide, propylene oxide and mixtures thereof.

30. The composition of claim 25 wherein the epihalohydrin is epichlorohydrin.

31. The composition of claim 25 wherein component 55,(A) is present in an amount equal to or less than 98% by weight, and said epihalohydrin copolymer is present in an amount equal to or more than 2% by weight.

32. The composition of claim 31 wherein component 55,(A) is present in an amount equal to or less than 95% by weight, and said epihalohydrin copolymer is present in an amount equal to or more than 5% by weight.

33. The composition of claim 31 wherein component 55,(A) is present in an amount equal to or less than 90% by weight and said epihalohydrin copolymer is present in an amount equal to or more than 10% by weight.

34. The composition of claim 25 wherein the ratio by weight of said epihalohydrin, to said-oxirane comonomer is equal to or less than 2:8.

35. The composition of claim 25 wherein the oxirane-containing comonomer is ethylene oxide.

36. The composition of claim 25 wherein the epihalohydrin copolymer is in solid form and has a number average molecular weight in excess of about 60,000, and wherein said epihalohydrin is selected from the group consisting of epichlorohydrin and epibromohydrin.

37. A composition of matter comprising a plastic material and an effective amount, but 20% or less by weight, of an antistatic agent distributed throughout said plastic material to improve antistatic properties of said plastic material,
   (a) wherein said plastic material is a graft copolymer of acrylonitrile, butadiene, and styrene, which is substantially free of non-nitrilated acrylic compounds; and
   (b) wherein said antistatic agent is a copolymer comprising from about 50% to about 95% by weight ethylene oxide and from about 5% to about 50% by weight epichlorohydrin.

38. An antistatic thermoplastic composition comprising:
   (A) 80% or more by weight of a copolymer having a diene rubber substrate and a rigid phase, said rigid phase including an acrylonitrile compound and a vinyl aromatic compound and being substantially free of non-nitrilated acrylic compounds; and
   (B) 20% or less by weight of an epihalohydrin copolymer of an epihalohydrin and an oxirane-containing comonomer, wherein the ratio by weight of said epihalohydrin to said oxirane comonomer is from 1:19 to 1:1;
wherein said epihalohydrin copolymer is present in an amount such that said antistatic thermoplastic composition has improved antistatic properties in comparison to said antistatic thermoplastic composition wherein said epihalohydrin copolymer is absent.

39. An antistatic thermoplastic composition comprising:
   (A) between 80 and 99% by weight of a graft copolymer of acrylonitrile, butadiene and styrene, which is substantially free of non-nitrilated acrylic compounds; and
   (B) between 1 and 20% by weight of an epihalohydrin copolymer of an epihalohydrin and an oxirane-containing comonomer, wherein the epihalohydrin copolymer contains between 5 and 50% by weight epihalohydrin;
wherein said epihalohydrin copolymer is present in an amount such that said antistatic thermoplastic composition has improved antistatic properties in comparison to said antistatic thermoplastic composition wherein said epihalohydrin copolymer is absent.

40. An antistatic thermoplastic composition comprising:
   (A) between 80 and 99% by weight of a graft copolymer of acrylonitrile, butadiene, and styrene, which is substantially free of non-nitrilated acrylic compounds; and
   (B) between 1 and 20% by weight of an epihalohydrin copolymer of an epihalohydrin and an oxirane-containing comonomer, wherein the epihalohydrin copolymer contains between 15% and 30% by weight epihalohydrin;

wherein said epihalohydrin copolymer is present in an amount such that said antistatic thermoplastic composition has improved antistatic properties in comparison to said antistatic thermoplastic composition wherein said epihalohydrin copolymer is absent.

41. An antistatic thermoplastic composition comprising:
   (A) 80% or more by weight of a copolymer, said copolymer being substantially free of non-nitrilated acrylic compounds and including an acrylonitrile compound and a vinyl aromatic compound, wherein the copolymer is grafted with a diene rubber substrate; and
   (B) 20% or less by weight of an epihalohydrin copolymer of an epihalohydrin and an oxirane-containing comonomer, wherein the ratio by weight of said epihalohydrin to said oxirane comonomer is from 1:19 to 1:1;

wherein said epihalohydrin copolymer is present in an amount such that said antistatic thermoplastic composition has improved antistatic properties in comparison to said antistatic thermoplastic composition wherein said epihalohydrin copolymer is absent.

* * * * *

UNITED STATES PATENT AND TRADEMARK OFFICE
CERTIFICATE OF CORRECTION

PATENT NO. : 6,369,159 B1
DATED : April 9, 2002
INVENTOR(S) : James P. Barnhouse et al.

It is certified that error appears in the above-identified patent and that said Letters Patent is hereby corrected as shown below:

<u>Title page,</u>
Item [73], delete "PDM" and substitute -- PMD -- in its place.

Signed and Sealed this

Thirteenth Day of August, 2002

*Attest:*

*Attesting Officer*

JAMES E. ROGAN
*Director of the United States Patent and Trademark Office*